United States Patent

Bayerl

[11] Patent Number: 5,612,755
[45] Date of Patent: Mar. 18, 1997

[54] MOTION PICTURE FILM RECORDING CAMERA

[75] Inventor: Eugen Bayerl, Kirchheim, Germany

[73] Assignee: Arnold & Richter Cine Technik GmbH & Co. Betriebs KG, Munich, Germany

[21] Appl. No.: 295,890

[22] PCT Filed: Mar. 10, 1992

[86] PCT No.: PCT/DE92/00205

§ 371 Date: Nov. 28, 1994

§ 102(e) Date: Nov. 28, 1994

[87] PCT Pub. No.: WO93/18433

PCT Pub. Date: Sep. 16, 1993

[51] Int. Cl.$^6$ ............ G03B 13/02; G03B 13/08; G03B 19/18; H04N 7/18
[52] U.S. Cl. ............ 352/136; 352/131; 348/64; 396/383; 396/385
[58] Field of Search ............ 354/223, 224, 354/225; 352/131, 136; 348/64

[56] References Cited

U.S. PATENT DOCUMENTS

| | | | |
|---|---|---|---|
| 2,698,356 | 12/1954 | Roos. | |
| 3,913,116 | 10/1975 | Kastner et al. | 354/223 |
| 4,591,254 | 5/1986 | Sokolowski | 354/223 |
| 4,705,374 | 11/1987 | Robings | 354/225 |
| 4,769,699 | 8/1988 | Gebauer et al. | 358/97 |
| 5,034,822 | 7/1991 | Stevens | 358/229 |
| 5,166,718 | 11/1992 | Suzuki et al. | 354/402 |

FOREIGN PATENT DOCUMENTS

| | | |
|---|---|---|
| 2029969 | 10/1970 | France. |
| 2200690 | 7/1973 | Germany. |
| 3615424 | 11/1987 | Germany. |
| 90136985 | 1/1991 | Germany. |
| 2076177 | 11/1981 | United Kingdom. |

OTHER PUBLICATIONS

Bedienungsanleitung, *ARRIFLEX 16 SRII*, 1984, (four sheets).

*Primary Examiner*—Safet Metjahic
*Assistant Examiner*—Daniel Chapik
*Attorney, Agent, or Firm*—Christie, Parker & Hale, LLP

[57] ABSTRACT

The invention relates to a compact motion picture film recording camera with a video adapter (16), an insertable cassette and a pivotable view lens, wherein a compact structure is achieved in spite of several functions in that a partially permeable reflecting beam splitter disposed in the view finder beam path reflects a view finder beam component into a view finder outlet on the front end (2) of the camera housing (1), a rearward-reversed eyepiece opening (12) of the viewing lens can be pivoted around the center axis (8) of the view finder outlet (7) between the right and left sides of the camera by means of a hinged lens arm (10) and an eyepiece support hinged thereon, and the video beam path (13) passed by the beam splitter is supplied through a grip base (15) of a camera grip to a video adapter (16) disposed thereon.

8 Claims, 3 Drawing Sheets

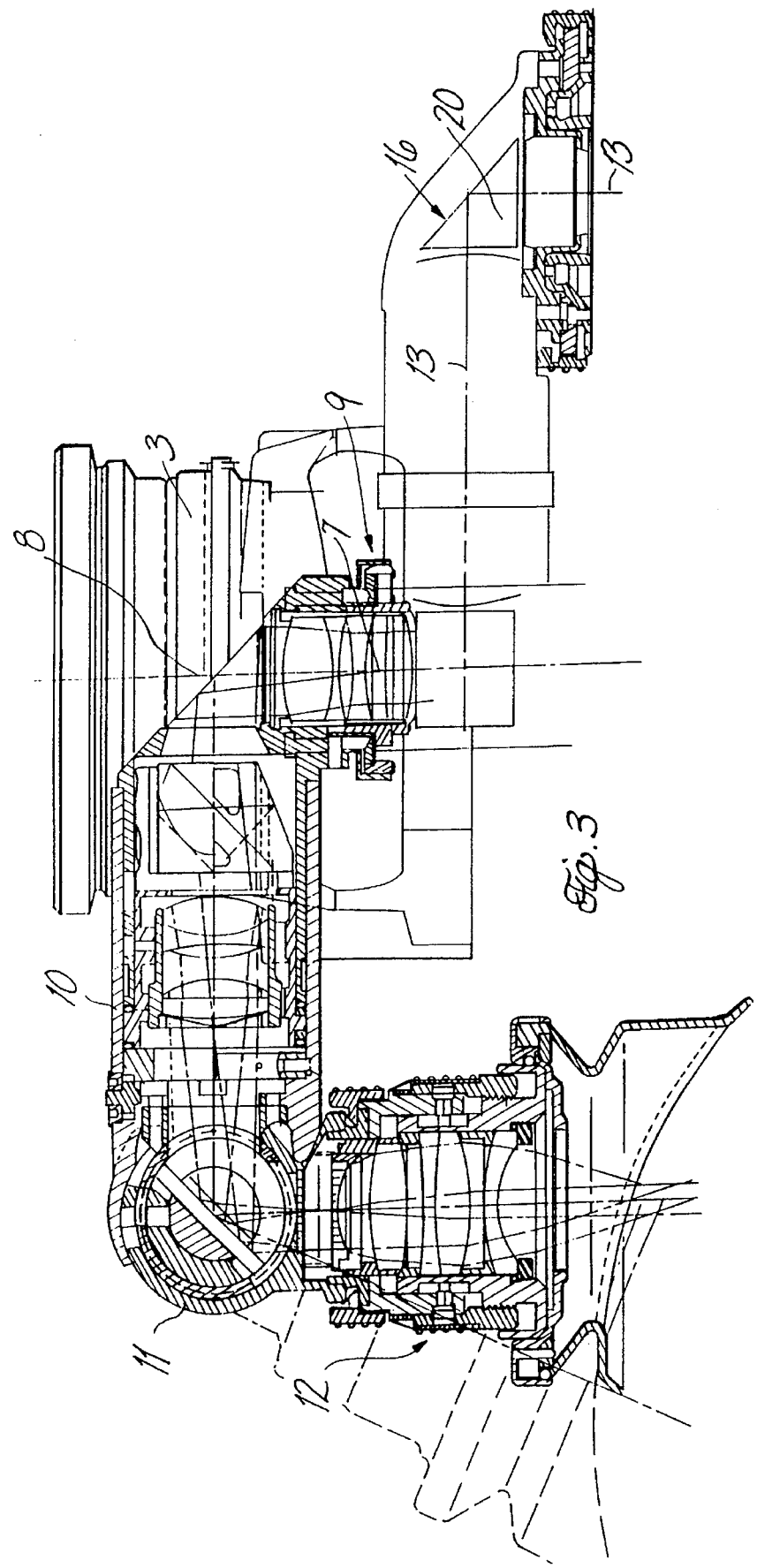

MOTION PICTURE FILM RECORDING CAMERA

FIELD OF THE INVENTION

The invention relates to a motion picture film recording camera with a film recording beam path, a view finder beam path deflected from it by means of a reflex device and with a video beam path diverted from the latter by means of a beam splitter.

BACKGROUND OF THE INVENTION

A motion picture film recording camera is known from German Patent Publication DE 36 15 424 C2, having a film recording beam path, from which a view finder beam path is diverted intermittently by means of a periodically interrupting mirror. A video beam path is then diverted to a video recording camera from this view finder beam path by a beam splitter, so that film and TV recordings can be made simultaneously.

This known camera has a bulky construction, because the view finder lens is rigidly disposed above the camera housing parallel to the lens, and the video recording camera vertically to the lens axis. With such an arrangement no compact camera design with a handle and attachable film cassettes is possible.

A motion picture reflex camera with an viewing lens is described in German Patent Publication DE 22 00 690 C3, wherein the view finder beam path, which is split off from the recording beam path by the reflex device, exits the camera housing centered above the recording lens. To make possible viewing with the left or the right eye, the view finder outlet from the camera housing is disposed on its front, and the eyepiece of the viewing lens, which is reversed toward the back by means of at least one hinged lens arm and an eyepiece support, can be pivoted around the center axis of this view finder outlet between the right and left sides of the camera.

There is a requirement for motion picture film recording cameras which are compactly designed and equipped with insertable cassettes and can be used in many ways despite their compact structure.

OBJECT AND SUMMARY OF THE INVENTION

It is the object of the invention to design a compactly constructed portable motion picture camera with insertable cassettes in such a way that it will permit a disposition of the viewing device on both sides, even if a video output is provided.

A motion-picture camera has a recording lens mounted on the front of the camera housing, a view finder mounted on the camera housing, a camera handle, a grip base rotatably seated on the top of the camera housing to mount the camera handle thereto, and a video adaptor disposed on the grip base. A film recording beam path is defined for passing a beam of light through the recording lens. A view finder beam path is defined for deflecting a portion of the beam passing through the recording lens to the view finder. Finally a video beam path is defined for deflecting a portion of the beam passing through the recording lens through the video adaptor.

The attainment of the object of the invention allows pivoting of the viewing device (view finder lens) of a motion picture camera toward both sides of the camera lens, so that right and left viewing of the object to be recorded is possible without problems, even if an additional video device is provided.

In an advantageous manner, a partially permeable reflecting beam splitter is disposed in the view finder beam path, which is split off from the film recording beam path, particularly by a reflex device, which reflects a view finder beam component into a view finder outlet on the front of the camera housing. A rearward-reversed eyepiece opening of the viewing lens can be pivoted around the center axis of this view finder outlet between the right and left sides of the camera by means of a hinged lens arm and an eyepiece support hinged thereon, and the video beam path passed by the beam splitter is supplied through a pivot bearing of the camera grip to a video adapter disposed on the grip.

By means of this structural design the view finder outlet as well as the exit of the video beam path are disposed in an advantageous manner at the front end of the camera, and the connection of the video adapter with the camera grip and the pivotable seating of the camera grip make it possible that by pivoting the grip, the back of the camera becomes easily accessible for a cassette to be inserted and that in the operating position of the grip there is a sufficient grip length available for easy and comfortable transport of the motion picture recording camera by means of the grip.

Furthermore, pivoting of the eyepiece opening from the left to the right side of the camera permits viewing from both sides and as well as from centered positions of the eyepiece opening in different uses of the camera. Because of the position of the video adapter it is possible to move this eyepiece opening in the pivoted position past the adapter and to use it thereafter.

Space is saved in particular in that in the operational position of the camera grip the video beam path exits the video adapter parallel to the eyepiece.

In order to place the exit of the video beam path out of the camera as far as possible toward the front, so that in spite of the insertion cassette there is a sufficient length of the grip available, an optical double-mirror device, in particular a rhomboid prism, which displaces the view finder beam path in the direction toward the front end of the camera housing, is inserted between the view finder beam path deflected out of the film recording beam path by the reflex device, and the beam splitter.

By means of this design, the view finder beam path which is periodically deflected, for example by a mirrored revolving shutter, is displaced parallel in the direction of the front side of the camera, to be supplied there to the beam splitter. This makes it possible to form the pivot bearing or the grip base of the grip in the area of the upper front edge of the film camera.

An exemplary embodiment of the invention will be described, making reference to the drawing figures.

BRIEF DESCRIPTION OF THE DRAWINGS

FIG. 3 is a top view, partially in section, of a front portion of the motion picture camera.

DETAILED DESCRIPTION OF THE EXEMPLARY EMBODIMENT

Figure 1:
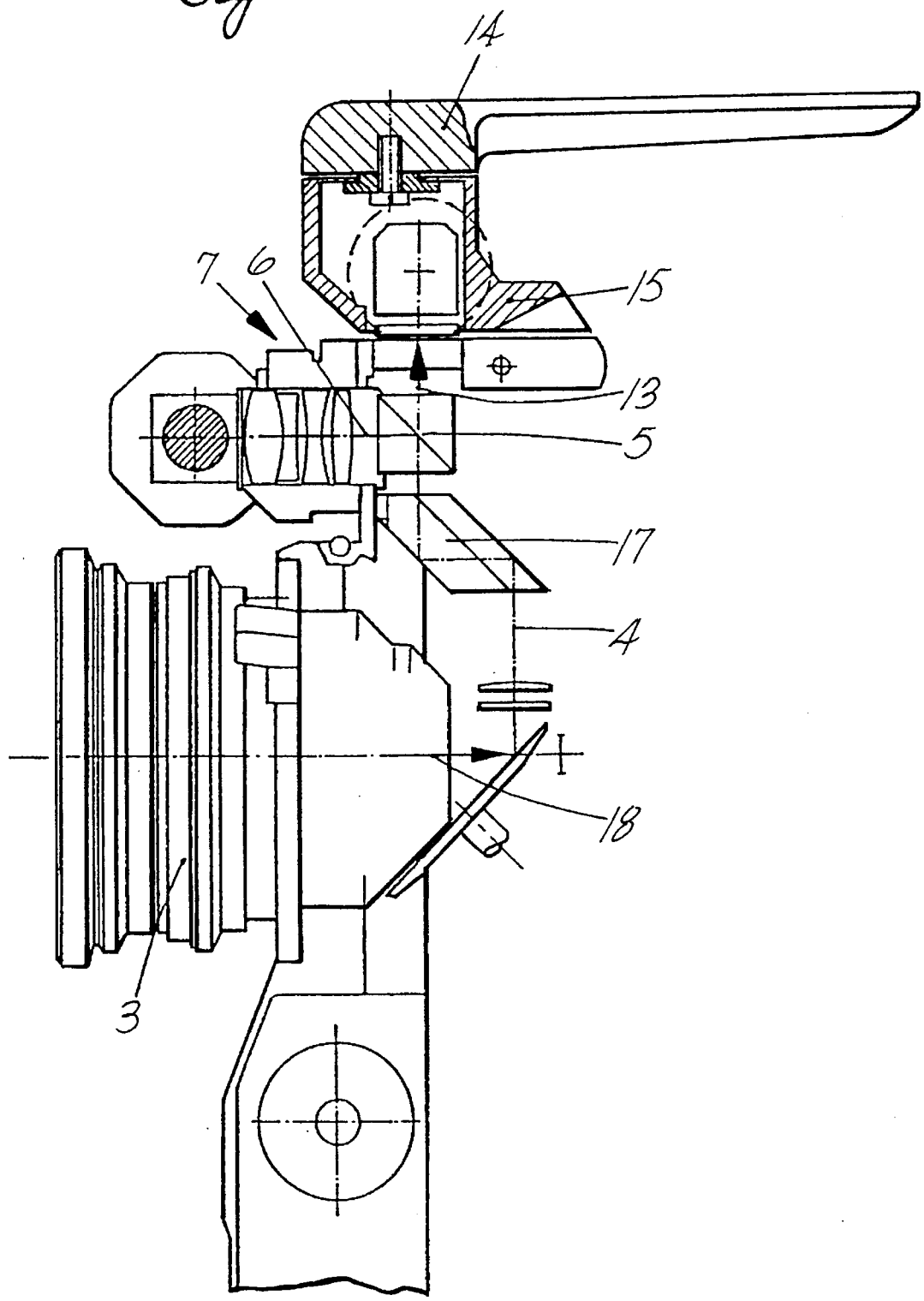
FIG. 1 is a schematic longitudinal sectional view of a portion of the motion picture film camera.

In accordance with FIG. 1, the motion picture camera has a housing 1, on the front end 2 of which a recording lens 3 is disposed. The film recording beam path passing through the recording lens 3 is periodically interrupted by a revolving mirror shutter, which deflects a view finder beam path 4 upward from this film recording beam path 18.

This view finder beam path 4 is displaced toward the front end 2 of the motion picture camera by means of a rhomboid prism 17 and impacts a partially reflecting or partially permeable beam splitter 5.

A beam component 6 is reflected by this beam splitter 5 to a view finder outlet 7 disposed in the front end 2 of the camera housing 1. In accordance with FIG. 3, a lens arm 10, hinged at 9, is seated pivotable through more than 200° around the center axis 8, and FIG. 2 makes clear several positions of the lens arm 10 in dash-dotted representations. An eyepiece support 11 is rotatably seated at the end of the lens arm 10 and the eyepiece opening 12 of the view finder lens is fastened on it.

As shown in FIG. 3, by means of this design viewing with the left eye and, by means of the pivotability of the eyepiece opening 12 shown in dash-dotted lines, viewing with the right and left eyes of the image generated by the recording lens 3 is made possible. By pivoting it around the center axis 8, the eyepiece opening 12 can be used for viewing from the right side, wherein viewing through the eyepiece opening with the left and right eyes is also possible.

The portion of the view finder beam path 4 passed through the beam splitter 4 constitutes a video beam path 13, shown schematically in FIG. 1. A grip base 15 of the camera grip is formed on the top of the camera housing 1 at the front end 2, and a handle 14 of the camera grip is rotatably seated in this grip base 15.

Figure 2:
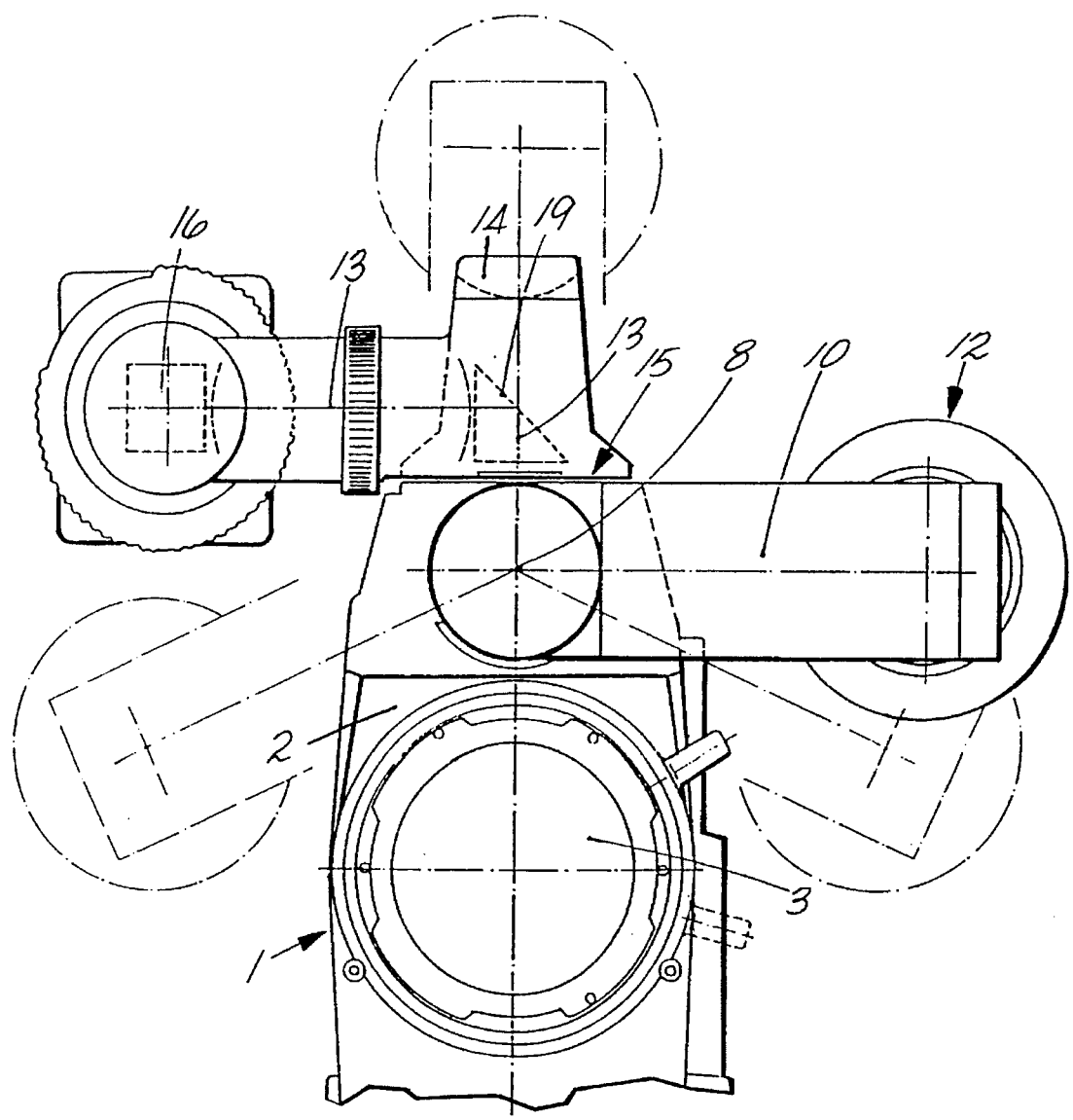
FIG. 2 is a schematic front view of a portion of the motion picture camera.

As shown schematically in FIGS. 2 and 3, the video beam path 13 is passed by the beam splitter 5 upwardly through the grip base 15 of the camera grip and is passed on by a reflecting prism 19 in the grip base 15 to a video adapter 16 mounted on the camera grip. The video beam path 13 is deflected in the video adapter by a prism 20, so that the video beam path 13 exits the video adapter 13 parallel to the recording lens 3. A video camera is connected in a manner known per se to the video adapter and is for example connected with a monitor via a video cable and in this way permits the separate viewing of the recorded image by an assistant.

As shown, by means of the combination of characteristics of the invention the view finder beam path is directed in such a way that viewing of the image on both sides and viewing on either side with the left eye or the right eye is made possible, wherein the video beam path can exit the front end of the camera in such a way that the camera can be carried by means of a handle on the camera grip, which can have an appropriate length.

The handle 14 of the camera grip, which because of its pivotability can have a length sufficient for simple handling without obstructing a cassette change, is rotatably seated on a grip base 15 of the camera grip and combined with the video output, so that both parts can be pivoted for inserting a insertion cassette.

What is claimed is:

1. A motion picture film recording camera having, during operation, a film recording beam, a view finder beam, and a video beam, the camera comprising:

a camera housing having opposite sides, a front, and a top;

a recording lens mounted on the front of the camera housing and defining a film recording beam path for the film recording beam;

a grip base seated in the top of the camera housing;

a camera handle attached to the grip base;

a video adapter disposed on the grip base and having a video beam path through the grip base to the video adapter;

a view finder having an outlet with a center axis mounted on the front of the camera housing and defining a view finder beam path;

a reflex device for reflecting a component of the film recording beam into the view finder beam path;

a beam splitter disposed in the view finder beam path, for directing a component of the view finder beam toward the front of the camera housing into the view finder outlet, and for directing a component of the view finder beam upward to the top of the camera housing into the video beam path through the grip base to the video adapter;

a lens arm pivotally attached to the camera housing;

an eye piece support attached to the lens arm;

a rearward facing eye piece attached to the eye piece support; and the lens arm, the support, and the eye piece being pivotal around the center axis of the view finder between the opposite sides of the camera.

2. The camera according to claim 1 wherein the lens arm, support, and eye piece are pivotal at least 200° between the opposite sides of the camera.

3. The camera according to claim 1 wherein the video beam is passed by the beam splitter and the view finder beam is reflected by the splitter.

4. The camera according to claim 1 further comprising an optical double mirror disposed in the view finder beam path for displacing the view finder beam path in a direction toward the front of the camera housing.

5. The camera according to claim 1 wherein the optical double mirror comprises a rhomboid prism interposed between the reflex device and the beam splitter.

6. The camera according to claim 1 wherein the reflex device comprises a revolving mirror shutter for periodically interrupting the film recording beam to deflect the view finder beam therefrom.

7. The camera according to claim 1 wherein the video adapter is mounted on the grip base such that the video beam path exits the video adapter parallel to the film recording beam path in a direction away from the front of the camera.

8. The camera according to claim 1 wherein the lens arm is attached forwardly on the camera housing relative to the grip base.

\* \* \* \* \*